United States Patent
Backstrom

(10) Patent No.: US 10,531,763 B1
(45) Date of Patent: Jan. 14, 2020

(54) COMPACT BREWING ASSEMBLY AND METHOD

(71) Applicant: Ralph William Backstrom, Olympic Valley, CA (US)

(72) Inventor: Ralph William Backstrom, Olympic Valley, CA (US)

( * ) Notice: Subject to any disclaimer, the term of this patent is extended or adjusted under 35 U.S.C. 154(b) by 0 days.

(21) Appl. No.: 15/008,771

(22) Filed: Jan. 28, 2016

Related U.S. Application Data

(60) Provisional application No. 62/110,783, filed on Feb. 2, 2015.

(51) Int. Cl.
*A47J 31/44* (2006.01)
*A47J 31/00* (2006.01)

(52) U.S. Cl.
CPC ........... *A47J 31/446* (2013.01); *A47J 31/005* (2013.01)

(58) Field of Classification Search
CPC .. A47J 31/20; A47J 31/02; A47J 31/44; A47J 31/50; A47G 19/14
USPC ....... 99/279, 287, 297, 322; 426/77, 82, 431
See application file for complete search history.

(56) References Cited

U.S. PATENT DOCUMENTS

| | | |
|---|---|---|
| 211,236 A | 1/1879 | Hartman, Jr. |
| 802,378 A | 10/1905 | Ellis |
| 955,616 A | 4/1910 | Tava |
| 1,499,281 A | 6/1924 | Altieri |
| 1,751,397 A | 3/1930 | Emile |
| 2,529,395 A | 11/1950 | Hummel |
| 2,601,821 A | 7/1952 | Francois |
| 3,120,170 A | 2/1964 | Garte |
| 3,596,806 A | 8/1971 | Harschel |
| 3,657,993 A | 4/1972 | Close |
| 3,695,168 A | 10/1972 | Van |
| 5,312,637 A | 5/1994 | Midden |
| 5,478,586 A | 12/1995 | Connor |
| 5,832,809 A * | 11/1998 | Gras ...................... A47J 31/547 219/689 |
| 5,942,143 A | 8/1999 | Hartman et al. |
| 6,298,771 B1 | 10/2001 | Calvento |
| 7,849,784 B2 | 12/2010 | Adler |
| 9,154,547 B2 | 10/2015 | Kuempel et al. |
| 9,179,798 B2 | 11/2015 | Albanese |
| 9,232,873 B2 * | 1/2016 | Juris ......................... A23F 3/18 |
| 2007/0137495 A1 * | 6/2007 | Talbert .................... A47J 31/20 99/286 |
| 2008/0216663 A1 * | 9/2008 | Williamson .......... A47J 31/467 99/279 |
| 2010/0116143 A1 * | 5/2010 | Cerroni .................... A47J 31/38 99/297 |
| 2011/0014340 A1 | 1/2011 | Spitzley et al. |
| 2011/0185912 A1 | 8/2011 | Chen et al. |
| 2012/0260806 A1 | 10/2012 | Rolfes et al. |

(Continued)

*Primary Examiner* — Tu B Hoang
*Assistant Examiner* — Thomas J Ward
(74) *Attorney, Agent, or Firm* — Kerr IP Group, LLC

(57) ABSTRACT

A compact brewing assembly and method is described. The compact brewing assembly includes a vessel, a filter component, an exterior sleeve and a cap. The vessel includes a vessel top and a vessel bottom, wherein the vessel top includes a fastening component. The filter component is removably coupled to the fastening component of the vessel top. The exterior sleeve includes a top exterior sleeve and a bottom exterior sleeve slidably coupled to the filter component. The cap is removably coupled to the top exterior sleeve.

17 Claims, 4 Drawing Sheets

(56) References Cited

U.S. PATENT DOCUMENTS

| | | | |
|---|---|---|---|
| 2014/0072684 A1* | 3/2014 | Madden | A47J 31/005 426/431 |
| 2014/0182458 A1 | 7/2014 | Fernandez | |
| 2014/0205725 A1 | 7/2014 | Albanese | |
| 2014/0251150 A1 | 9/2014 | Vessey | |
| 2014/0251152 A1 | 9/2014 | Tien | |
| 2014/0322410 A1 | 10/2014 | Khan et al. | |
| 2015/0059592 A1 | 3/2015 | Richardson | |

* cited by examiner

COMPACT BREWING ASSEMBLY AND METHOD

CROSS REFERENCE

This patent application claims the benefit of provisional patent application 62/110,783 entitled COMPACT BREWING ASSEMBLY AND METHOD filed on Feb. 2, 2015.

FIELD

The present invention relates to a compact brewing assembly and method that is portable and operates manually. More specifically, the compact brewing assembly and method enables an operator to control steep time with a concentric sealable tube that holds the steeping liquid so that when a downward force is applied to the concentric sealable tube, the steeping liquid passes through an infusible material such as coffee, tea or other such compound.

BACKGROUND

Brewing tea and coffee is a complex process with many variables that affect the resulting flavor of the tea or coffee. These variables include water temperature, coarseness of ground coffee beans, degree of roasting of the coffee beans, the ratio of ground coffee to water and length of time the grounds are in contact with water.

Commonly used manual brewing devices include the French press, in which water is added to coffee grounds in a carafe and allowed to steep for a particular time period. The operator then applies a downward force to the French press plunger to separate the coffee grounds from the finished brew. The finished brew may then be poured or kept in the carafe. When the finished brew is kept in the carafe, compounds from the grounds continue to be extracted and these compounds contribute to the bitterness of the finished brew. For example, coffee grounds that are left to sit in the carafe increase the amount of chlorogenic acid, which causes noticeable bitterness in the resulting cup of coffee.

Another common method of brewing a cup of coffee employs the "pour over" method, in which grounds are placed in a cone shaped filter, and water is poured over the top of the cone shape filter. In operation, the heated water gravity flows through the grounds and the finished brew is collected in a separate vessel. The method allows gravity to take the water through the grounds and into the vessel below. There is no time control, as gravity does the work.

In both the French press and the "pour over" method, the operator of the brewing equipment cannot effectively control the steep time because control of the steep time is dependent on the brewing device. The steep time for tea or coffee will depend on the type of tea or coffee and the individual preferences of the operator.

Although there are some devices that give the operator control over steep time, there are various challenges associated with using these devices. Often, devices that provide control of steep time are bulky and only brew a single cup of coffee or tea. Additionally, hot water leaks from these brewing devices because they lack an integrated industrial design, in which the separate component can smoothly and logically interface with one another. Trying to circumvent the limitations of these brewing devices may require a separate container, e.g. a mug, for mixing the brewing material and hot water, which is not portable or compact. Furthermore, devices that provide control over steep time require a precarious setup process or inverting the brewing device, which may leak. Further still, it would be beneficial to provide a compact brewing assembly that can brew two or more cups of coffee or tea in a compact brewing assembly.

SUMMARY

A compact brewing assembly and method is described. The compact brewing assembly includes a vessel, a filter component, an exterior sleeve and a cap. The vessel includes a vessel top and a vessel bottom, wherein the vessel top includes a fastening component. The filter component is removably coupled to the fastening component of the vessel top. The exterior sleeve includes a top exterior sleeve and a bottom exterior sleeve slidably coupled to the filter component. The cap is removably coupled to the top exterior sleeve.

In an illustrative embodiment, the fastening component of the vessel top includes at least one of a threaded top and a twist lock top. In a second illustrative embodiment, the filter component includes a gasket that interfaces with the exterior sleeve. In another illustrative embodiment, the filter component includes at least one air vent and at least one finished brew channel. In a further illustrative embodiment, the filter component includes a biasing element.

The compact brewing assembly may also include a base having a top base opening that receives the vessel bottom. The compact brewing assembly is also collapsible so that the base, exterior sleeve and cap encapsulate the vessel and the filter component.

In operation, the exterior sleeve is configured to receive a mixture that includes a brewing material and a volume of water via the top exterior sleeve. The mixture is allowed to steep. The cap is then coupled to the top exterior sleeve. A downward force is applied to the cap or exterior sleeve, which causes the biasing element to open at least one finished brew channel so that the mixture passes through the filter and a finished brew is received by the vessel. The filter gasket interfaces with the exterior sleeve so that the exterior sleeve is slidably coupled to the filter component.

Additionally, the filter biasing element is compressed when the mixture is being filtered. The filter allows air to escape from the vessel or sleeve. Additionally, the filter allows the liquid mixture in the exterior sleeve to pass through the filter and the finished brew is collected by the vessel. The filter component is then separated from the vessel that includes the finished brew. The finished brew can then be poured into the base.

The compact brewing method includes coupling a filter component to a vessel. The vessel includes a vessel bottom and a vessel top having a fastening component that is removably coupled to the filter component. The method then proceeds to receive a mixture that includes a receiving the mixture in a top exterior sleeve associated with an exterior sleeve that includes a bottom exterior sleeve. A cap is then coupled to the top exterior sleeve. The method allows the mixture to steep for a period of time in the exterior sleeve and cap. The filter component is removably coupled to the threaded vessel top associated with the vessel. The filter is then slidably coupled to the bottom exterior sleeve. The mixture is filtered by the filtered component so that a finished brew is collected by the vessel.

The method then proceeds to separate the filter component from the vessel that includes the finished brew. In the illustrative embodiment, the compact brewing apparatus is collapsible so that the vessel and filter component are encapsulated by the base and the sleeve.

FIGURES

The present invention will be more fully understood by reference to the following drawings which are for illustrative, not limiting, purposes.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems and apparatus described hereinafter may vary as to configuration and as to details. Additionally, the methods may vary as to details, order of the actions, or other variations without departing from the illustrative methods disclosed herein.

The compact brewing assembly and method presented herein enables an operator to control the steep time when brewing coffee or tea. The compact brewing assembly also prevents hot water leaks and provides a sturdy and robust system for brewing coffee and tea. Additionally, the compact brewing assembly is also collapsible and portable. Furthermore, the collapsible brewing assembly encapsulates the filter component and vessel that receives the finished brew. Further yet, the compact brewing assembly described herein provides a compact brewing assembly that can brew two or more cups of coffee or tea. Further still, the compact brewing assembly and method is scalable so larger amounts of coffee simply require a larger filter and larger brewing assembly.

Figure 1:
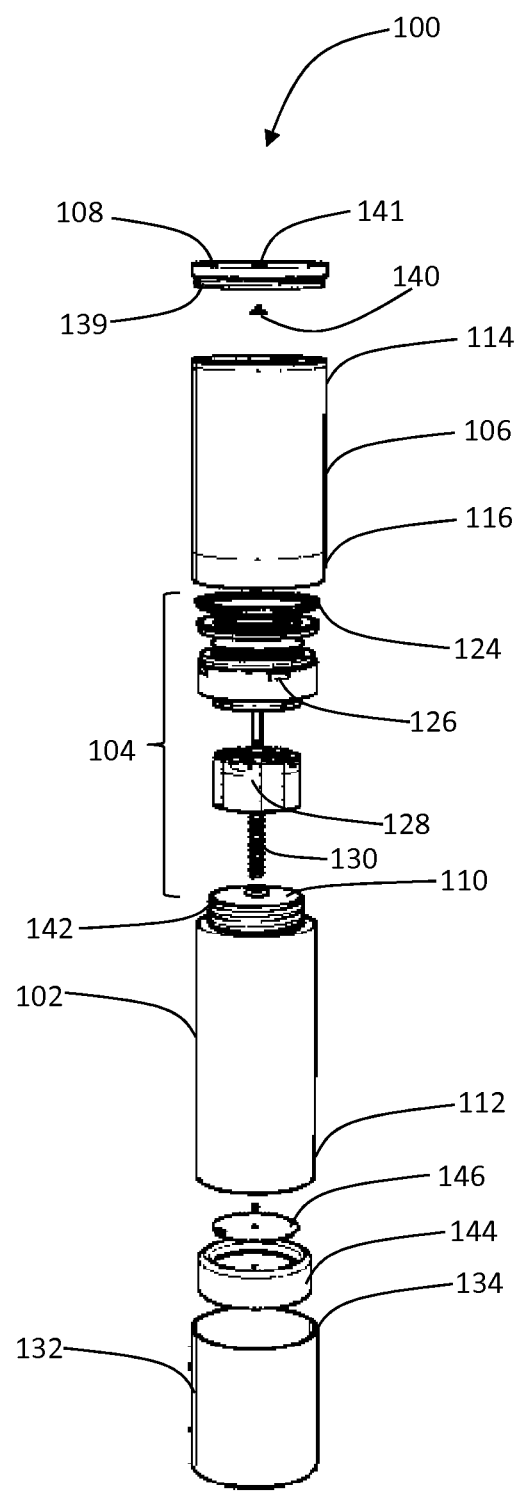
FIG. 1 shows a perspective view of the various elements of an illustrative compact brewing assembly.

Referring to FIG. 1 there is shown a perspective view of the various elements of an illustrative compact brewing assembly 100. The illustrative compact brewing assembly 100 includes a vessel 102, a filter component 104, an exterior sleeve 106 and a cap 108. The illustrative vessel 102 includes a threaded vessel top 142, a top vessel opening 110 and a vessel bottom 112. The filter component 104 is removably coupled to the threaded vessel top 142.

The illustrative threaded vessel top 142 is provided for illustrative purposes only. More generally, the vessel top 142 includes a fastening component, which is removably coupled to the filter component 104. The fastening component of the illustrative embodiment includes a vessel top with threads on the exterior of a neck*** that sits on cylindrical vessel 102, in which the exterior threads of the vessel top are removably coupled to filter component 104. Alternatively, the fastening component of the cylindrical vessel 102 does not have a neck and, instead, the cylindrical vessel includes interior threads (not shown) that interface with the exterior threads (not shown) of the filter component 104. In yet another alternative embodiment, the fastening component may include a twist-lock top that does not include threads. For example, the illustrative twist-lock top (not shown) may include one or more flanged edges that are received by a filter cap (not shown), which locks into place after partially turning the filter component 104 or vessel 102.

Figure 2:
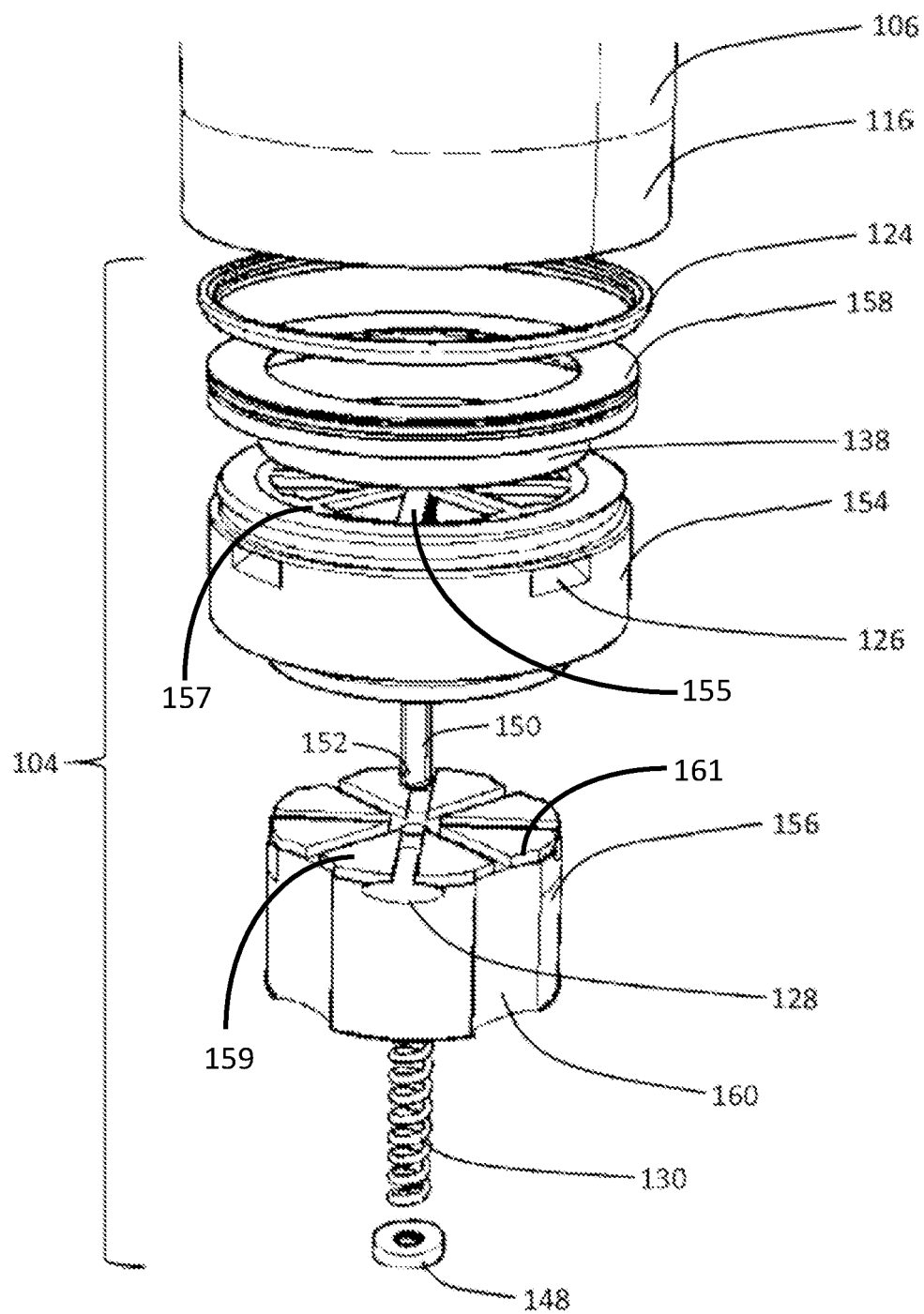
FIG. 2 shows a more detailed view of the filter component associated with the compact brewing assembly.

A more detailed view of the illustrative filter component 104 is provided in FIG. 2. The illustrative filter component 104 includes a gasket 124 that interfaces with the exterior sleeve 106. In another illustrative embodiment, the filter component 104 includes at least one air vent 126 and at least one finished brew channel 128. In a further illustrative embodiment, the filter component 104 includes a biasing element 130. In operation, a downward force is applied to the cap or exterior sleeve, which causes the biasing element to open at least one finished brew channel so that the mixture passes through the filter and a finished brew is received by the vessel.

Returning to FIG. 1, the illustrative exterior sleeve 106 includes a top exterior sleeve 114 and a bottom exterior sleeve 116 slidably coupled to the filter component 104. The cap 108 is removably coupled to the top exterior sleeve 114. In one illustrative embodiment, the cap 108 is configured to receive a valve 140 that lets air into the exterior sleeve 106. The illustrative cap 108 includes a cap opening 141 that receives an illustrative one-way valve 140. In another illustrative embodiment, the cap 108 does not include the illustrative one-way valve 140. Additionally, the removable cap 108 includes a threaded end 139 that interfaces with receiving threads (not shown) of the top exterior sleeve 114.

Figure 3:
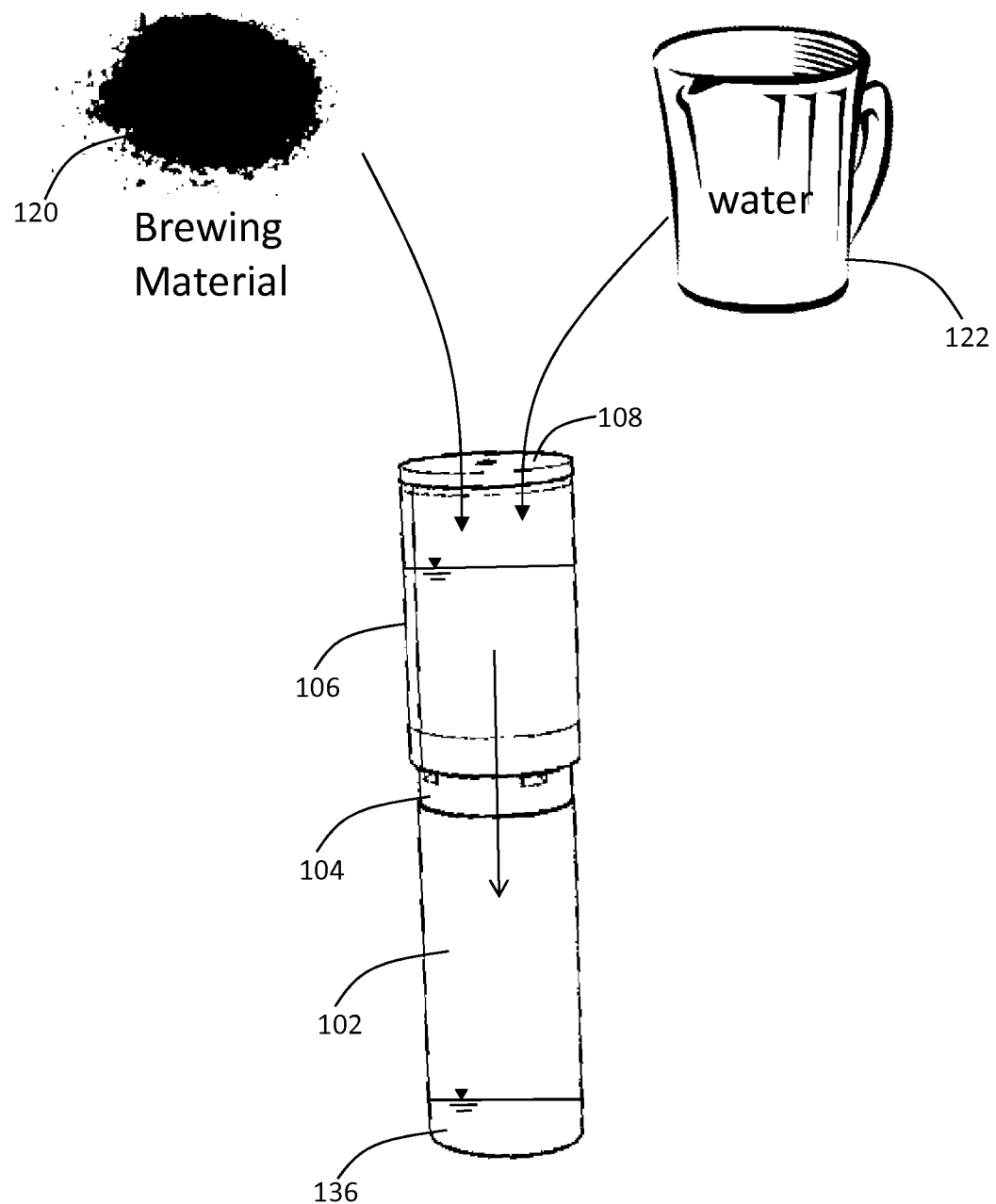
FIG. 3 shows an illustrative process for generating a mixture with the brewing material.

Referring now to FIG. 3, the cap 108 and the exterior sleeve 106 receive a mixture 118 that includes a brewing material 120 and a volume of water 122 via the bottom exterior sleeve 116. In FIG. 3, there is shown an illustrative process of generating a mixture 118 with the brewing material 120, e.g. coffee or tea, and water 122. As shown in FIG. 3, the mixture 118 is received by the exterior sleeve 106, in which the top exterior sleeve 114 opening is sealed with the cap 108.

Returning to FIG. 1, the illustrative compact brewing assembly 100 also includes a base 132 having a top base opening 134 that receives the vessel bottom 112. The base 132 may also be used as a separate drinking cup. Additionally, the illustrative base may also receive an illustrative sip cap 144 and a sip cap valve 146. In one illustrative embodiment, the sip cap 144 has internal receiving threads (not shown) that interface with the threaded vessel top 142. Alternatively, the sip cap may include a twist-lock top. The sip cap valve 146 prevents the finished brew from spilling.

Figure 4:
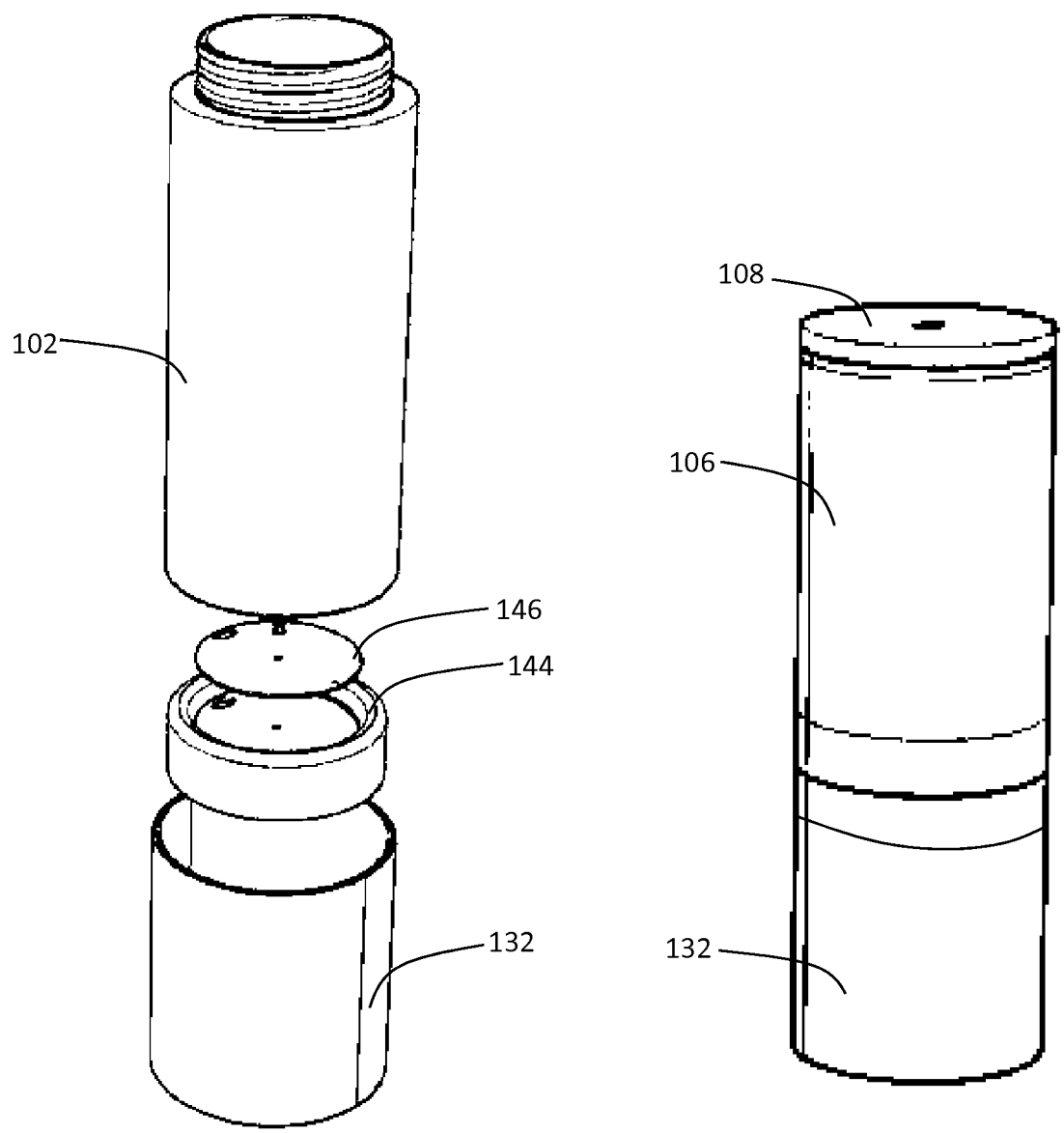
FIG. 4 shows a portable and compactly joined brewing assembly, in which the vessel and filter component are encapsulated by a based, an exterior sleeve and cap.

The compact brewing assembly 100 is also collapsible so that the base 132, the exterior sleeve 106 and the cap 108 encapsulate the vessel 102 and the filter component 104, which is shown in further detail in FIG. 4.

Referring now to FIG. 2 there is shown a more detailed view of the filter component 104 that operates as a filter and a valve. In the illustrative embodiment, the filter component 104 is rotatably coupled to the threaded vessel top 142 (shown in FIG. 1). The illustrative filter component 104 also includes a gasket 124 that interfaces with the bottom exterior sleeve 116 corresponding to exterior sleeve 106. Additionally, the filter component 104 includes at least one air vent 126 and at least one finished brew channel 128. The air vent 126 allows air from the vessel to escape. The finished brew channel 128 receives the finished brew after it has passed through filter 138.

Furthermore, the illustrative filter component 104 includes a biasing element 130 such as illustrative spring 130. Additionally, a locking nut 148 is shown adjacent to the illustrative spring 130. The spring 130 and locking nut 148 interface with stem 150 that includes a threaded stem end 152. The threaded stem end 152 is received by locking nut 148.

The illustrative stem 150 is fixedly coupled to illustrative filter holder 154, which includes eight (8) valve plug spars 155 and four (4) air vents 126. Four (4) of the valve plug spars 155 correspond to the four (4) air vents 126, these four (4) valve plug spars 155 further include broad spar bases 157. The bottom of the filter holder 154 also interfaces with the air/brew separator 156, which includes at least one air channel 160, at least two valve seats 159, and at least one finished brew channel 128. The air channel 160 in the air/brew separator 156 interfaces with the corresponding air vent 126 in the filter holder 154 and the air exits through illustrative air vent 126. The finished brew channel 128 receives the finished brew after the mixture has passed filter 138. In the illustrative embodiment, the air/brew separator 156 includes eight (8) wedge shaped valve seats 159 that are each bordered by an air channel 160 on a first side and a finished brew channel 128 on a second side. Thus, none of the valve seats 159 abut one another, but are instead separated by a space that corresponds to a valve plug spar 155. Further, each valve seat 159 includes a notch 161 on the side corresponding to the air channel that interfaces with a broad spar base 157.

The top of the filter holder interfaces with the filter 138 and with a flanged gasket holder 158. The flanged gasket holder is configured to interface or receive the gasket 124. By way of example and not of limitation, the illustrative gasket may be embodied as a flexible o-ring. The illustrative filter 138 may be composed of a metallic alloy, a paper filter, a plastic filter or other such materials that are capable of separating the grounds or leaves from the mixture. The filter holder 154, air/brew separator, and flanged gasket holder may be composed of a rigid plastic, metal alloy or other such rigid materials.

In operation, the filter component 104 filters the mixture and also operates as a valve that allows air to escape from the vessel 102 or the capped sleeve 106. Firstly, the filter component allows the liquid mixture in the exterior sleeve to pass through the filter component 104 and the finished brew is collected in the vessel 102. When a downward force is applied to the capped sleeve 106, the filter component operates as a valve by transitioning from a closed state to an open state, in which air is released through the air vents 126 and the filtered finished brew flows through at least one brew channel 128. However, when the biasing element of filter component 104 is not compressed, the filter component is in the closed state and the passage of liquid from the exterior sleeve 106 to the vessel 102 is blocked because the valve plug spars155 of the filter holder 154 interface with the valve seats 159 of the air/brew separator 156. When the valve plug spars155 of the filter holder 154 interface with the valve seats 159 of the air/brew separator 156 in the closed state, the valve plug spars 155 close or block the finished brew channels 128 and the passages formed between the air channels 160 of the air/brew separator 156 and the air vents 126 of the filter holder 154.

The compact brewing assembly and method presented herein is configured to support having the mixture in the exterior sleeve not pass through the filter component 104 until the capped exterior sleeve 106 is forced downward by the operator and the biasing element is compressed. Additionally, the finished brew collected by the vessel 102 does not come in contact with the mixture, leaves or grounds that are filtered by the filter component. Further still, the finished brew is sealed in the vessel 102 by the filter component.

Referring now to FIG. 3 and FIG. 2, there is shown an illustrative process for generating a mixture with the brewing material and water. The compact brewing method includes removably coupling the filtering component 104 to the vessel top 110 with a fastening component as described above. In operation, the cap 108 is removed from the exterior sleeve 106 so that the exterior sleeve 106 can receive a mixture that includes a brewing material 120, e.g. coffee or tea, and a volume of water 122.

After mixing the mixture 118, the mixture 118 is allowed to steep for a period of time that is determined by the operator. The operator then proceeds to place the cap 108 on the top exterior sleeve 114. The bottom exterior sleeve 116 is configured to interface with the gasket 124 as presented above. The operator applies sufficient downward pressure to the capped sleeve 106 so the mixture is filtered by filter component 104. The mixture then passes through filter 138 and a finished brew 136 is received by the vessel 102. The filter gasket 124 (not shown) interfaces with the exterior sleeve 106 so that the exterior sleeve is slidably coupled to the filter component 104.

In the illustrative embodiment, the filter biasing element 130 (shown in FIGS. 1 and 2) is compressed when the mixture is being filtered and the filter component 104 operates as a valve that allows air to escape and the filtered mixture or finished brew to be collected by vessel 102. Additionally, the cap 108 may include a valve 140, so that when the filter component 104 is removed from the exterior sleeve 106, the valve 140 lets air flow into the exterior sleeve 106. The filter component 104 is then separated from the vessel 102, which now includes the finished brew 136.

Thus, the compact brewing method includes receiving the mixture in the exterior sleeve 106, in which the top exterior sleeve is removably coupled to the cap 104. The method allows the mixture to steep for a period of time in the exterior sleeve and cap. The filter component 104 is removably coupled to the threaded vessel top associated with the vessel. The filter component is then slidably coupled to the bottom exterior sleeve 116. The mixture 118 is filtered by the filtered component 104 so that a finished brew 136 is collected by the vessel 102. The filter component is then separated from the vessel, which includes the finished brew.

Referring to FIG. 4 there is shown the compact brewing assembly, in which the vessel and filter component are encapsulated by the base and the sleeve. More specifically, the base 132 is configured to receive the sip cap 144, the sip cap valve 146 and the bottom of the vessel 102. Additionally, the exterior sleeve 106 and cap 108 are configured to encapsulate the filter component 104 and the top of the vessel 102 as shown in FIG. 1 and FIG. 3 above. Thus, the compact brewing assembly is transportable and includes tubular components that are collapsible and cohesive.

The compact brewing assembly presented herein is also scalable, so that brewing larger amounts of coffee or tea would simply require a larger filter and a larger brewing assembly. For example, the illustrative compact brewing assembly embodiments presented above may be enlarged so that the exterior sleeve 106 holds a larger mixture and the vessel holds more finished brew.

In an alternative large scale embodiment, the filter component 104 may be removably coupled to the exterior sleeve 106 and a separate vessel is used to collect the finished brew. The exterior sleeve 106 of this alternative embodiment may hold a larger mixture of coffee or tea. A large lever (not shown) may replace the cap and be used to press the mixture in the exterior sleeve through the filter component 104 that is removably coupled to the exterior sleeve. A vessel disposed below the filter would then collect the finished brew.

The larger brewing assembly may require the application of greater pressure to force larger amounts of water through the grounds or leaves. The application of greater pressure may be performed with manual levers or gears that offer the required mechanical advantage need to filter the mixture.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

100 compact brewing assembly
102 vessel
104 filter component
106 exterior sleeve
108 cap
110 vessel top
112 vessel bottom
114 top exterior sleeve
116 bottom exterior sleeve
118 mixture
120 brewing material
122 volume of water
124 gasket
126 air vent
128 finished brew channel
130 biasing element
132 base
134 top base opening
136 finished brew
138 filter
139 threaded end
140 valve
141 cap opening
142 threaded vessel top
144 sip cap
146 sip cap valve
148 locking nut
150 stem
152 threaded stem end
154 filter holder
156 air/brew separator
158 flanged gasket holder
160 air channel

What is claimed is:

1. A compact brewing assembly comprising:
a vessel including a vessel top and a vessel bottom, wherein the vessel top includes a fastening component;
a filter component removably coupled to the fastening component of the vessel top, the filter component including a filter holder and a separator;
the filter holder including at least one air vent and at least one valve plug spar;
the separator including at least two valve seats, at least one air channel, and at least one finished brew channel, wherein the at least one finished brew channel extends between the at least two valve seats;
the filter component having an initial state wherein the at least one valve plug spar abuts the at least two valve seats and the at least one finished brew channel to form a closed valve;
the filter component having a second state wherein the at least one valve plug spar separates from the at least two valve seats and the at least one finished brew channel to form an open valve that allows liquid to flow from an exterior sleeve down into the vessel, the second state triggered by a downward force upon the vessel top;
the exterior sleeve includes a top exterior sleeve and a bottom exterior sleeve slidably coupled to the filter component; and
a cap removably coupled to the top of the top exterior sleeve.

2. The compact brewing assembly of claim 1 wherein the fastening component of the vessel top includes at least one of a threaded top and a twist lock top.

3. The compact brewing assembly of claim 1 wherein the filter component includes a gasket that interfaces with the exterior sleeve.

4. The compact brewing assembly of claim 1 wherein the filter component includes a biasing element.

5. The compact brewing assembly of claim 4 further comprising a base having a top base opening that receives the vessel bottom.

6. The compact brewing assembly of claim 5 wherein the base, the exterior sleeve and the cap encapsulate the vessel and the filter component.

7. A compact brewing assembly comprising:
an exterior sleeve that includes a top exterior sleeve and a bottom exterior sleeve;
a cap removably coupled to the top of the exterior sleeve, wherein the cap and exterior sleeve are configured to receive a mixture that includes a brewing material and a volume of water via the bottom exterior sleeve;
a vessel having a vessel top and a vessel bottom, wherein the vessel top includes a fastening component;
a filter component removably coupled to the fastening component of the vessel top, the filter component including a filter holder and a separator;
the filter holder including at least one air vent configured to release air from the vessel and at least one valve plug spar;
the separator including at least two valve seats, at least one air channel, and at least one finished brew channel that receives a finished brew after the mixture has been filtered, wherein the at least one finished brew channel extends between the at least two valve seats, wherein the filter component is slidably coupled to the bottom exterior sleeve,
the filter component having an initial state wherein the at least one valve plug spar abuts the at least two valve seats and the at least one finished brew channel to form a closed valve;
the filter component having a second state wherein the at least one valve plug spar separates from the at least two valve seats and the at least one finished brew channel to form an open valve that allows liquid to flow from the exterior sleeve down into the vessel, the second state triggered by a downward force upon the vessel top; and
wherein the mixture passes through the filter component in the second state and the finished brew is received by the vessel.

8. The compact brewing assembly of claim 7 wherein the filter component further includes a gasket that interfaces with the exterior sleeve so that the exterior sleeve is slidably coupled to the filter component.

9. The compact brewing assembly of claim 7 wherein the filter component includes a biasing element that is compressed when the mixture is being filtered.

10. The compact brewing assembly of claim 9 wherein the fastening component of the vessel top includes at least one of a threaded top and a twist lock top.

11. The compact brewing assembly of claim 10 wherein the filter component is separated from the vessel that includes the finished brew.

12. A compact brewing method comprising,
   coupling a filter component to a vessel, wherein the vessel includes a vessel bottom and a vessel top having a fastening component that is removably coupled to the filter component, and wherein the filter component includes a filter holder and a separator, the filter holder including at least one air vent configured to release air from the vessel and at least one valve plug spar, the separator including at least two valve seats, at least one air channel, and at least one finished brew channel, wherein the at least one finished brew channel extends between the at least two valve seats;
   placing the filter component in an initial state where the at least one valve plug spar abuts the at least two valve seats and the at least one finished brew channel to form a closed valve;
   receiving a mixture that includes a brewing material and a volume of water in a top exterior sleeve associated with an exterior sleeve that includes a bottom exterior sleeve;
   coupling a cap to the top exterior sleeve;
   allowing the mixture to steep for a period of time in the exterior sleeve;
   slidably coupling the filter component to the bottom exterior sleeve; and
   filtering the mixture with the filter component by exerting a downward force upon the vessel top to separate the at least one valve plug spar from the at least two valve seats and the at least one finished brew channel and transition the filter component from the initial state to a second state where the valve is open so that a finished brew is received by the at least one finished brew channel, the finished brew collected by the vessel.

13. The compact brewing method of claim 12 wherein the filter component further includes a gasket that interfaces with the exterior sleeve so that the exterior sleeve is slidably coupled to the filter component.

14. The compact brewing method of claim 12 wherein the filter component includes a biasing element that is compressed when the mixture is being filtered.

15. The compact brewing method of claim 14 wherein the fastening component of the vessel top includes at least one of a threaded top and a twist lock top.

16. The compact brewing method of claim 12 wherein the filter component is separated from the vessel that includes the finished brew.

17. The compact brewing method of claim 12 further comprising encapsulating the vessel and filter component with a base and the sleeve, wherein the base includes a top base opening that receives the vessel bottom and the base is configured to interface with the sleeve.

* * * * *